United States Patent [19]

Leskovec

[11] Patent Number: 4,506,750

[45] Date of Patent: Mar. 26, 1985

[54] PIVOTAL HOOD ARRANGEMENT

[75] Inventor: Edward V. Leskovec, Eastlake, Ohio

[73] Assignee: Towmotor Corporation, Mentor, Ohio

[21] Appl. No.: 514,436

[22] Filed: Jul. 18, 1983

[51] Int. Cl.[3] .............................................. B62D 25/10

[52] U.S. Cl. .............................. 180/69.21; 180/89.17; 180/329

[58] Field of Search ................. 180/69.2, 69.21, 89.17, 180/68.5, 89.14, 328, 326, 329, 331; 296/65 R, 66; 114/201 R; 160/188

[56] References Cited

U.S. PATENT DOCUMENTS

| | | | |
|---|---|---|---|
| 4,076,302 | 2/1978 | Sable | 180/89.14 X |
| 4,122,728 | 10/1978 | Pilarczyk | 74/103 |
| 4,238,008 | 12/1980 | Higgins et al. | 180/328 |
| 4,262,958 | 4/1981 | Houseman et al. | 180/89.14 X |
| 4,312,418 | 1/1982 | Rittman | 180/68.5 |
| 4,330,007 | 5/1982 | Leskovec | 137/565 |

*Primary Examiner*—David M. Mitchell

*Assistant Examiner*—Mark C. Dukes

*Attorney, Agent, or Firm*—Alan J. Hickman

[57] ABSTRACT

A hood (18) and a control device (38) mounted on a vehicle (10) adjacent the hood (18) obstructs access to a source of motive power (24) of the vehicle (10), interferes with removal of the source of motive power (24) resulting in damage to the control device (38) and hood (18), and requires additional steps be taken to prepare the vehicle (10) for servicing. A pivotal hood arrangement (16) having a hood (18) and a control device (38) mounted on the hood (18) is provided. The control device (38) is movable with the hood into an opening (48) in the vehicle (10) to permit maximum movement of the hood (18) to an uncovering position (28). A closing device (52) is provided for closing the opening (48) and a retainer (74) is provided for holding the closing device (52) at a closed position (59). Thus, the problems of access, interference, damage and additional steps are eliminated. The pivotal hood arrangement (16) is particularly suited for use in a lift truck (10).

19 Claims, 4 Drawing Figures

PIVOTAL HOOD ARRANGEMENT

DESCRIPTION

1. Technical Field

This invention relates to a pivotal hood arrangement and more particularly to a vehicle having a hood pivotally mounted thereon, a control device mounted on the hood and movable with the hood into an opening in the vehicle to permit adequate pivotal movement of the hood to an uncovering position relative to a source of motive power, and a device for closing the opening when the hood is at a covering position with the source of motive power.

2. Background Art

Vehicles and in particular lift trucks frequently have a hood which is mounted on the vehicle and pivotally movable between covering and uncovering positions relative to a source of motive power, such as a battery or engine, for servicing thereof. Usually, the operator seat is mounted on the hood and a control device, such as an implement control valve, is provided at a location as closely adjacent the seat as possible for reasons of operator accessibility, comfort, and controllability.

U.S. Pat. No. 4,312,418 dated Jan. 26, 1982 to Udo Rittman discloses one embodiment of a hood arrangement for a lift truck. The control valve is mounted on a bracket assembly which is manually pivotable forwardly of the battery toward the lift mast from an overlying position relative to the battery to a position at which the control valve is spaced from the battery. Similarly the hood is pivotal in a rearward direction relative to the lift truck from a covering position to an uncovering position relative to the battery. This arrangement requires the hood and control valve both be individually manually moved to permit battery removal in a vertical direction from the vehicle and thus increases the amount of time required to service the battery. This arrangement limits access to the battery from either side of the vehicle as the hood and control valve block access from the front and rear. Because some access to the battery is available when the hood is in the uncovering position, it is possible that the service technician may forget to move the control valve prior to battery removal and thus cause damage to the control valve and the battery.

U.S. Pat. No. 4,238,008, dated Dec. 9, 1980 to Robert D. Higgins et al, illustrates two embodiments of a hood arrangement in which the hood is pivoted in a forward direction to provide access to the battery for servicing and removal. In these embodiments an implement control valve is mounted on a fixed frame member of the vehicle at a location spaced from the battery and free from interference with the battery during removal. The control valve control lever is mounted on the hood and movable with the hood. Because of the relative movement between the hood and control valve a complicated expensive linkage arrangement is required to connect the control lever to the control valve. Also the amount of pivotal forward movement of the hood is limited due to interference between the floor of the lift truck and the hood.

The present invention is directed to overcoming one or more of the problems as set forth above.

DISCLOSURE OF THE INVENTION

In one aspect of the present invention, a vehicle having a source of motive power and a hood connected to the vehicle and pivotally movable between covering and uncovering positions relative to the source of motive power is provided. A control device is mounted on the hood and movable with the hood into an opening in the vehicle at the uncovering position of the hood. A door, connected to the vehicle, is movable between open and closed positions relative to said opening. The door is movable to the open position in response to pivotal movement of the hood to the uncovering position and an apparatus urges the door to the closed position and positively holds the door at the closed position in response to the hood being at the covering position.

In another aspect of the invention, a vehicle having a front end, a motive power source, a floor, and a hood is provided. A hinge pivotally connects the hood to the vehicle at a location between the source of motive power and the front end. The hood is pivotally movable about the hinge between covering and uncovering positions relative to the source of motive power. A control device is mounted on the hood and movable with the hood. An opening is disposed in the floor and aligned to receive at least a portion of the control device. The control device is disposed in the opening at the uncovering position of the hood and spaced from the opening at the covering position of the hood. A device movable between open and closed positions with respect to the opening and an apparatus for retaining the device at the closed position in response to said hood being at the covering position is provided.

Because the control device is mounted on the hood and pivotal therewith full access to the source of motive power is achieved by simply pivoting the hood to the uncovering position. Since the control device does not require independent movement, the potential for damage to the control device is eliminated during removal of the source of motive power. Thus, placing the hood in the uncovering position not only provides access to the source of motive power but permits removal thereof.

The opening in the vehicle permits the control device to be mounted on the hood at a most desirable location for operator accessibility and comfort while offering increased accessibility to the source of motive power. Since the control device passes into the opening, interference between the floor and the control device and hood are eliminated which permits increased pivotal hood movement and better accessibility.

The device which closes the opening and the apparatus which retains the device in the closed position permits the operator to be supported on the vehicle floor at the location of the opening. Because the device is automatically movable between the open and closed positions as determined by the position of the hood the necessity of manually moving the device or the potential of forgetting to close the device is overcome. Since the apparatus automatically retains the device at the closed position when the hood is at the covering position inadvertent opening of the device is prevented, even under the weight of the operator.

BEST MODE FOR CARRYING OUT THE INVENTION

Figure 1:
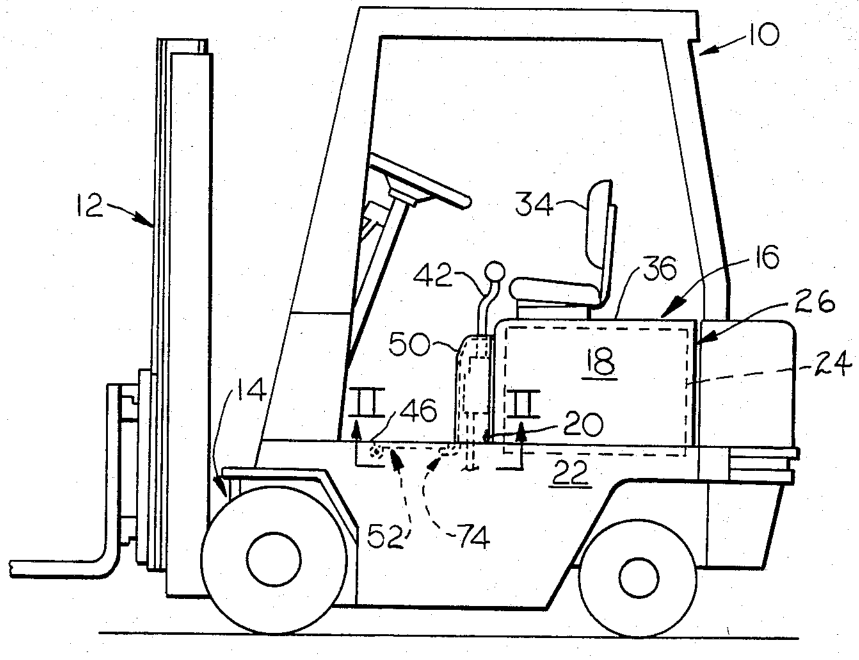
FIG. 1 is a diagrammatic side elevational view of an embodiment of the present invention showing a lift truck having a pivotal hood arrangement having a control device mounted on the hood adjacent the operator's seat.
Figure 2:
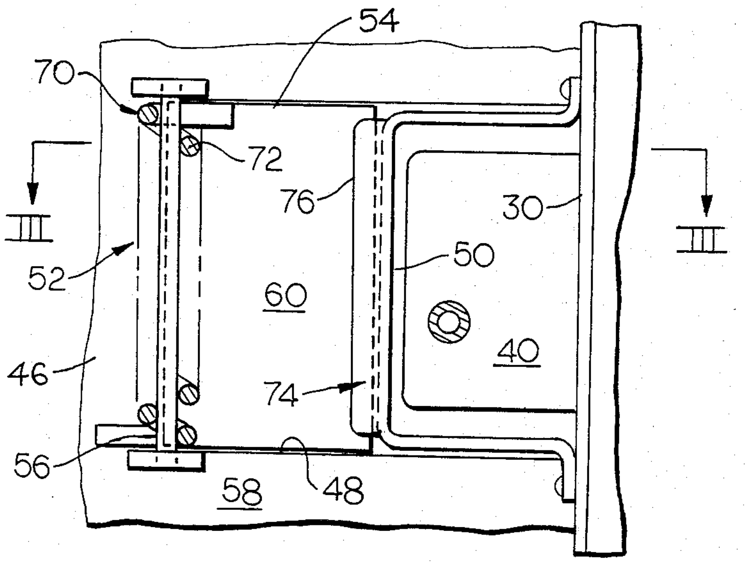
FIG. 2 is an enlarged diagrammatic bottom view taken along lines II—II of FIG. 1, showing a door positioned at a closed position in an opening in a floor of the vehicle, a door hinge, a device for urging the door to the closed position, and an apparatus for holding the door at the closed position.

With reference to the drawings, a vehicle 10, such as a lift truck, has a mast 12, mounted on a front end 14 thereof and a hood arrangement 16. The hood arrangement 16 includes a hood 18 which is pivotally connected by a hood hinge 20 to a frame 22 of the vehicle 10 at a location longitudinally relative to the vehicle between the front end 14 and a source of motive power 24, such as a battery or engine. The hood 18 is pivotal about the hood hinge 20, longitudinally relative to the vehicle between a covering position 26 (FIGS. 1 and 3) relative to the source 24 and an uncovering position 28 (FIG. 4) relative to the source 24. At the uncovering position 28 the source is fully accessible from either side or the rear of the vehicle 10 and clear of the source 24 to provide vertical removal of the source 24. Preferably, the hood 18 has a front side member 30 and the hood hinge 20 pivotally connects the front side member at a bottom end portion 32 thereof to the frame 22 so that no portion of the hood 18 moves toward or contacts the source during pivotal movement to the uncovering position 28. The front side member 30 is located between the source of motive 24 power and the front end of the vehicle 10 so that the hood 18 pivots in a forward direction relative to the vehicle to the uncovering position 28 and in a rearward direction relative to the vehicle to the covering position 26.

An operator's seat 34 is mounted on a top surface portion 36 of the hood 18 and a control device 38 is mounted on the front side member 30 at an optimum location relative to the operator's seat 34, such as by threaded fasteners (not shown). The control device 38 preferably includes a control valve 40, at least one control lever 42 for actuating the control valve 40 and controlling the mast 12, and a flexible hose 43 connecting the control valve to an implement jack (not shown). The control lever 42 is pivotally connected to the front side member 30 and the control valve 40 by a bell crank arrangement 44. The control lever 42 extends in a substantially vertical direction from the bell crank to a location adjacent the operator's seat 34 and is easily, accessible to the operator. The control device 38 is movable with the hood in response to pivotal movement of the hood 18 away from the source of motive power 24 so as to permit access to and removal of the source of motive power 24 without interference thereby. It should be noted that electrical or mechanical devices may be substituted for the control valve 40 without departing from the spirit of the invention.

To eliminate interference between the control device 38 and the vehicle 10, and in particular a vehicle floor 46, during pivotal movement of the hood 18 toward the uncovering position, an opening 48 is provided in the floor 46. The opening 48 is a "U" shaped notch disposed in the floor 46 at a location adjacent the front side member 30 and aligned to receive in a passing relationship therewith at least a portion of the control device 38.

A shroud 50 is disposed about the control valve 40 in a surrounding relationship therewith so as to protect the operator from dirt, oil, noise emissions and the like passed from beneath the vehicle 10. The shroud 50 is mounted on the front side member 30 of the hood in any suitable manner and is smaller in width than the width of opening 48. Thus the shroud 50 is movable into the opening 48 of the hood, in response to movement of the hood 18 to the uncovering position.

Figure 3:
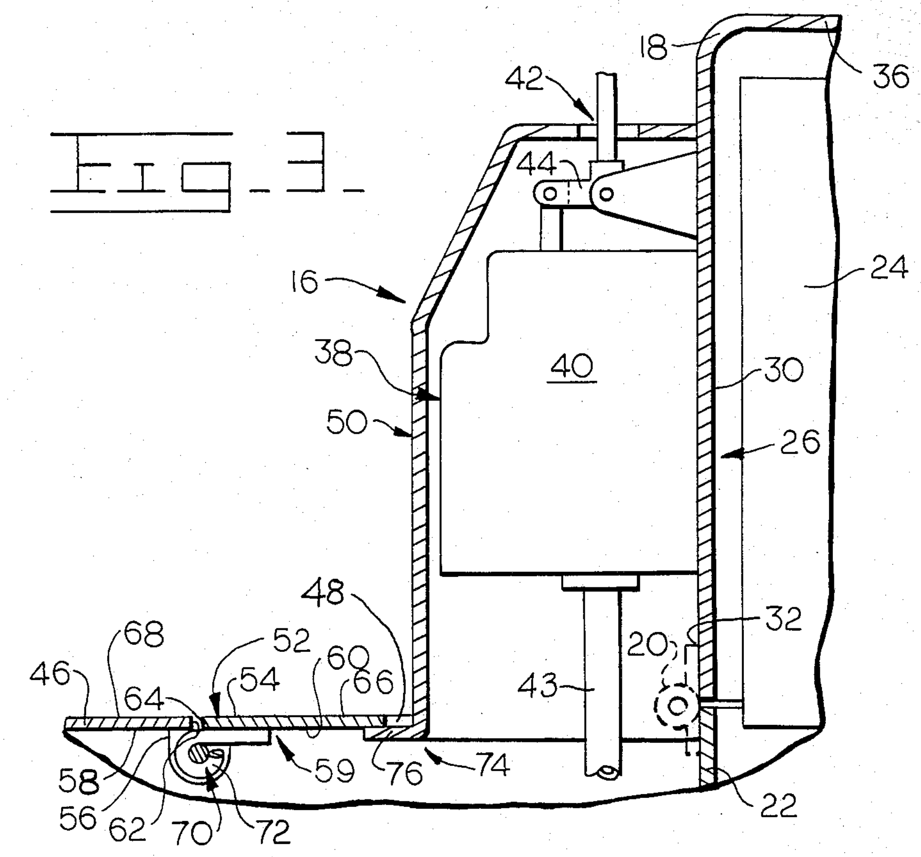
FIG. 3 is an enlarged side sectional view taken along lines III—III of FIG. 2, showing the pivotal hood arrangement at the closed position and in greater detail.
Figure 4:
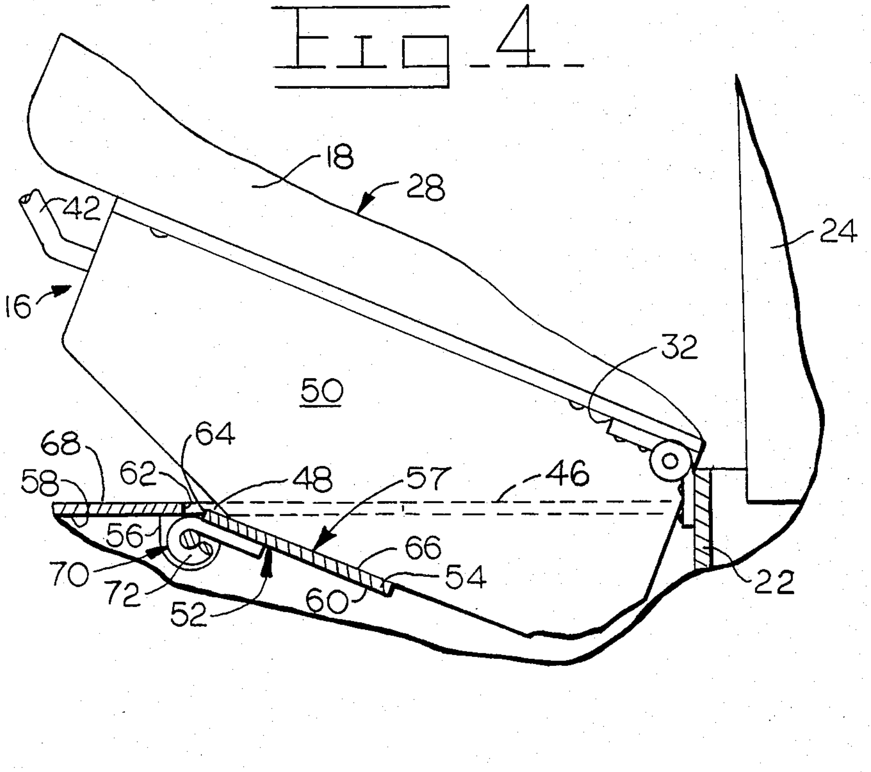
FIG. 4 is an enlarged partial side elevational view of the lift truck of FIG. 1 with portions broken away showing the pivotal hood arrangement with the hood tipped forwardly to an uncovering position relative to a source of motive power, the control device disposed in the opening, and the door at the open position.

Because the opening is considerable in size, the floor space available for the operator to support his feet during normal vehicle operation or during mounting of the vehicle 10 is inadequate. Therefore, a device 52 for closing the aperture is provided. The device 52 includes a door 54 having dimensions slightly smaller than the width of the opening 48. A door hinge 56 pivotally connects the door 54 to the floor 46 for pivotal movement between open 57 and closed 59 positions with respect to the opening 48. Specifically, the door hinge 56 connects a bottom surface 58 of the floor to a bottom surface 60 of the door at a location adjacent a front edge 62 of the opening and a front edge 64 of the door. The door 54 pivots about the door hinge 56 longitudinally relative to the vehicle in a downward, clockwise direction to the open position 57, as seen in FIG. 4, and in upward counterclockwise direction to the closed position 59 as seen in FIG. 3. When the door 54 is at the closed position a top surface 66 of the door is flush with a top surface 68 of the floor 46.

A device 70 is provided for urging the door 54 to the closed position 59 and positively holding the door at the closed position when the hood 18 is at the covering position 26. The urging device 70 includes a torsion spring 72 connected to the door hinge 56 and engaged with the floor bottom surface 58 and the door bottom surface 60. The urging device 70 also includes a retainer 74 which is engageable with the door 54 to hold the door at the closed position 59. The retainer 74 has a projection 76 which is connected to the hood 18 and engageable with the bottom surface 60 of the door 54 at the covering position of the hood 18. The projection is preferably formed as an extension of the shroud 50 which projects from the shroud 50 in a direction toward the front end 14 of the vehicle.

The shroud 50 forceably engages the door 54 during pivotal movement of the hood toward the uncovering position 28 and moves the door 54 to the open position 57. This door movement permits the shroud to move into the opening 48 to a location elevationally past the floor 46 which allows the hood 18 to pivot to the uncovering position. Conversely movement of the hood 18 to the covering position allows the spring 72 to move the door 54 to the closed position 59. Since the projection engages the bottom surface 60 of the door when the hood 18 is at the covering position 26, the weight of the operator may be supported on the door 54 without opening the door.

INDUSTRIAL APPLICABILITY

In operation and with reference to the drawings, to obtain access to the source of motive power 24 for service or removal thereof from the vehicle the technician simply unlatches a hood latch (not shown) and pivots the hood 18 in a forwardly, counterclockwise direction longitudinally relative to the vehicle and about the hood hinge 20 toward the uncovering position 28. During this movement the shroud 50 engages the door 54 and forces the door to the open position which permits the shroud 50 and the control device 38 to move into the opening 48 to a location elevationally beneath the floor 46 which allows the hood 18 to pivot to the uncovering position 28, at which full access to the source 24 is available from opposite sides and the rear of the vehicle.

To return the hood 18 to the covering position 26 relative to the source of motive power 24, as seen in FIGS. 1 and 3, the technician simply pivots the hood in a clockwise direction relative to the hood hinge 20 and in a longitudinal rearward direction relative to the vehicle 10. During this movement the shroud 50 moves away from the door 54 which allows the door 54 to automatically pivot about the door hinge 56 toward the floor 46, under the bias of spring 72, to the closed position 59 at which the top surface 66 of the door 54 is flush with the top surface of the floor 68. Further, movement of the door past the closed position is prevented by providing stops on either the door hinge 56, the door 54 or the floor 46 in a conventional manner (not shown).

The retainer 74 engages the bottom surface 60 of the door 54 when the hood 18 and door 54 are at the covering 26 and closed 59 positions, respectively, and prevents inadvertent opening of the door. Therefore the door 54 provides additional surface area upon which the vehicle operator may stand and also blocks dirt, water, and noise from passing from beneath the vehicle through the opening 48.

Therefore the hood arrangement 16 permits sufficient tipping of the hood to provide full access to the source of motive power 24 and provides adequate floor area upon which the operator may be supported. Since the door 54 automatically opens and closes in response to movement of the hood 18 and the control device 38 moves with the hood, no additional manual steps are required to prepare the vehicle for servicing or operation.

Other aspects, objects and advantages of this invention can be obtained from a study of the drawings, the disclosure and appended claims.

I claim:

1. In a vehicle (10) having a hood (18) and a source of motive power (24), said hood (18) being pivotally connected to said vehicle (10) and pivotally movable between covering (26) and uncovering (28) positions relative to said source of motive power (24); the improvement comprising:

an opening (48) disposed in said vehicle (10);

a control device (38) mounted on said hood (18) and movable with said hood (18), said control device (38) being disposed in said opening (48) at the uncovering position (28) of said hood (18);

a door (54) connected to said vehicle (10) and being movable between open and closed positions (57,59) relative to said opening (48), said door (54) being movable to said open position (57) in response to pivotal movement of said hood (18) to the uncovering position (28); and means (70) for urging said door (54) to the closed position (59) and for positively retaining said door (54) at the closed position (59) in response to said hood (18) being at the covering position (26).

2. The vehicle (10) as set forth in claim 1 wherein said means (70) for urging includes;

a projection (76) connected to said hood (18) and engageable with said door (54) at the closed position (59) of said door (54).

3. The vehicle (10) as set forth in claim 2 including:

a floor (46);

said opening being disposed in said floor (46), said door (54) being pivotally connected to said floor (46), said door (54) having a bottom surface (60), said bottom surface (60) being engageable by said projection (76).

4. The vehicle (10) as set forth in claim 2 including:

a floor (46), said opening (48) being disposed in said floor (46);

a door hinge (56) pivotally connecting said door (54) to said floor (46) and said means (70) for urging includes;

spring means (72) for biasing said door (54) to the closed position (59).

5. The vehicle (10) as set forth in claim 2 wherein said hood (18) includes;

a front side member (30) having a bottom end portion (32);

a hood hinge (20) pivotally connecting said bottom end portion (32) to said vehicle (10); and said projection (76) extending from said hood (18) in a direction toward said door (54).

6. The vehicle (10) as set forth in claim 2 wherein said hood (18) includes;

a front side member (30) having a bottom end portion (32);

a hood hinge (20) pivotally connecting the bottom end portion (32) to said vehicle (10); and a shroud (50) disposed about said control device (38) and connected to the front side member (30) of said hood (18), said projection (76) being connected to said shroud (50).

7. The vehicle (10) as set forth in claim 5 including:

a floor (46);

a door hinge (57) pivotally connecting said door (54) to said floor (46);

said door (54) being located between said front side member (30) and said door hinge (56) and forwardly of the hood (18) relative to the vehicle (10).

8. The vehicle (10) as set forth in claim 3 wherein said door (54) is positioned in said opening (48) and flush with said floor (46) at the closed position (59) of said door (54).

9. The vehicle (10) as set forth in claim 6 wherein said shroud (50) forceably engages said door (54) to move to the open position (57) in response to pivotal movement of said hood (18) to the uncovering position (28).

10. In a vehicle (10) having a front end (14), a motive power source (24), a floor (46) and a hood (18), a hood hinge (20) pivotally connecting the hood (18) to said vehicle (10) at a location between said source of motive power (24) and said front end (14), said hood (18) being pivotally movable about said hood hinge (20) between covering and uncovering positions (26,28) relative to the source of motive power (24); the improvement comprising:

a control device (38) mounted on said hood (18) and movable therewith;

an opening (48) disposed in said floor (46) and aligned to receive at least a portion of said control device (38), said control device (38) being disposed in said opening (48) at the uncovering position (28) of said hood (18) and spaced from said opening (48) at the covering position (26) of said hood (18);

means (52) for closing said opening (48), said means (52) for closing being movable between open and closed positions (57,59) with respect to said opening (48); and means (74) for retaining said means (54) for closing at the closed position (59) thereof in response to said hood (18) being at the covering position (26).

11. The vehicle (10) as set forth in claim 10 wherein said means (52) for closing includes;

a door (54) pivotally connected to said floor (46), said door (54) being forceably urged by the hood (18) to the open position (57) in response to pivotal movement of the hood (18) to the uncovering position (28).

12. The vehicle (10) as set forth in claim 11 wherein said means (74) for retaining includes;

a projection (76) connected to the hood (18), said projection (76) being positioned beneath the door (54) and in contact therewith at the covering position (26) of said hood (18).

13. The vehicle (10) as set forth in claim 11 wherein said means (52) for closing said opening (48) includes;

a spring means (72) for biasing said door (54) towards the closed position (59).

14. The vehicle (10) as set forth in claim 11 wherein said door (54) is flush with said floor (46) at the closed position (59) of said door (54).

15. The vehicle (10) as set forth in claim 11 wherein said hood (18) includes;

a shroud (50) disposed about the control device (38) and connected to said hood (18), said shroud (50) being movable into said opening (48) in response to movement of said hood (18) to the uncovering position (28), said shroud (50) being engageable with said door (54) to pivotally move said door (54) to the open position (57).

16. The vehicle (10) as set forth in claim 15 wherein said opening (48) is a U-shaped notch disposed in said floor (46) at a location adjacent the shroud (50).

17. The vehicle (10) as set forth in claim 10 wherein said hood (18) includes;

a front side member (30), a top portion (36) and a hood hinge (20) pivotally connecting the front side member (30) to the vehicle (10), said control device (38) being mounted on said front side member (30) at a location elevationally above the floor (46) and elevationally below said top portion (36).

18. The vehicle (10) as set forth in claim 11 wherein said control device is a hydraulic control valve.

19. In a lift truck (10) having a front end portion (14), a lift mast (12) mounted on said front end portion (12), a hood (18) having a front side member (30), an operator's seat (34) mounted on said hood (18), a floor (46), a source of motive power (24) mounted on said lift truck (10), and a hood hinge (20) pivotally connecting the front side member (30) of said hood (18) to said lift truck (10), the improvement comprising:

a control device (38) mounted on the front surface (30) of said hood (18), said control device (38) being actuatable to control said lift mast (12), said hood (18) being pivotally movable in a direction towards said lift mast (12) to an uncovering position (28) relative to said source of motive power (24) and in a direction away from said lift mast (12) to a covering position (26) relative to said source of motive power (24), said control device (38) being movable with said hood (18);

an opening (48) disposed in said floor (46) and aligned to receive at least a portion of said control device (38), said control device (38) being disposed in said opening (48) at the uncovering position (28) of said hood (18) and spaced from said opening (48) at the covering position (26) of said hood (18);

a door (54) pivotally connected to said floor (46) and pivotally movable between open and closed positions (57,59) relative to said opening (48);

a shroud (50) being connected to said hood (18) and disposed in a covering relationship about said control device (38), said shroud (50) being movable with said hood (18) and engageable with said door (54);

a spring (72) connected to said door (54), said spring (72) biasing said door (54) to the closed position (59), said door (54) being urged by said shroud (50) to the open position (57) in response to pivotal movement of said hood (18) to the uncovering position (28); and a projection (76) connected to said hood (18) and engageable with said door (54), said projection (76) holding said door (54) at the closed position (59) when said hood (18) is at the covering position (26).

* * * * *